Sept. 13, 1960 W. TIRASPOLSKY ET AL 2,952,440
WELL-DRILLING TURBINES
Filed April 10, 1958 3 Sheets-Sheet 2
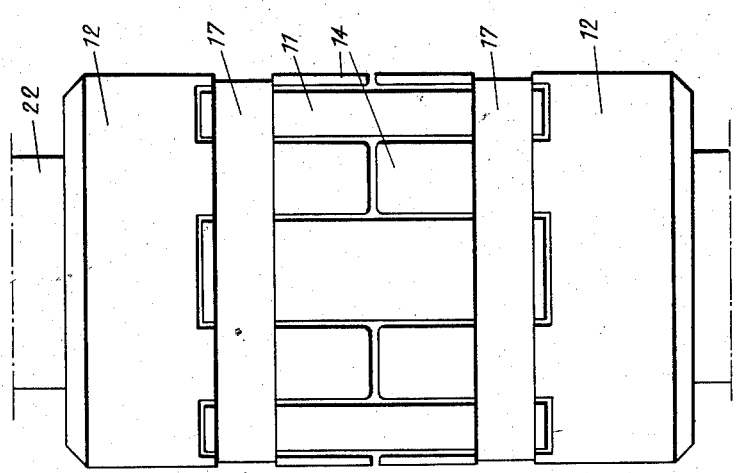
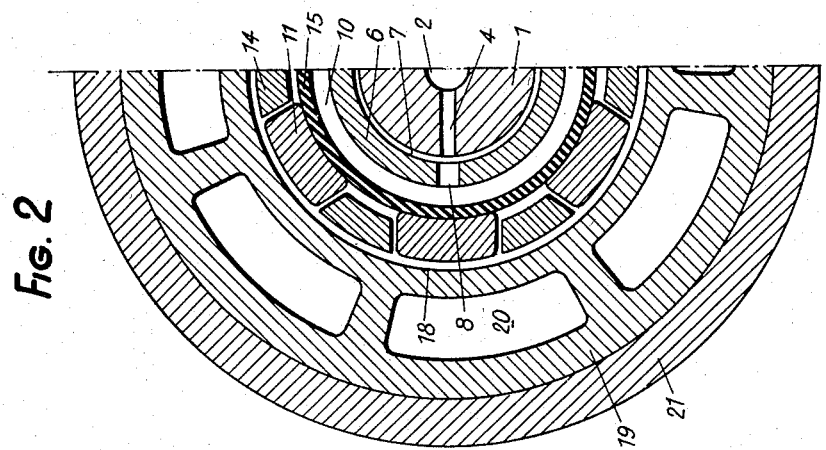

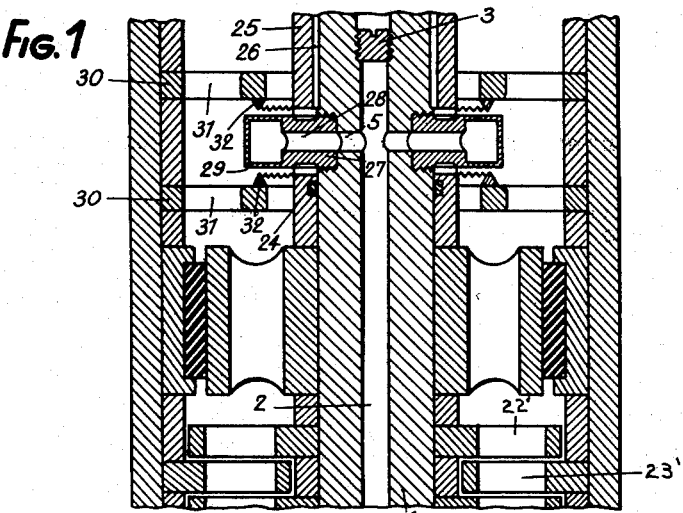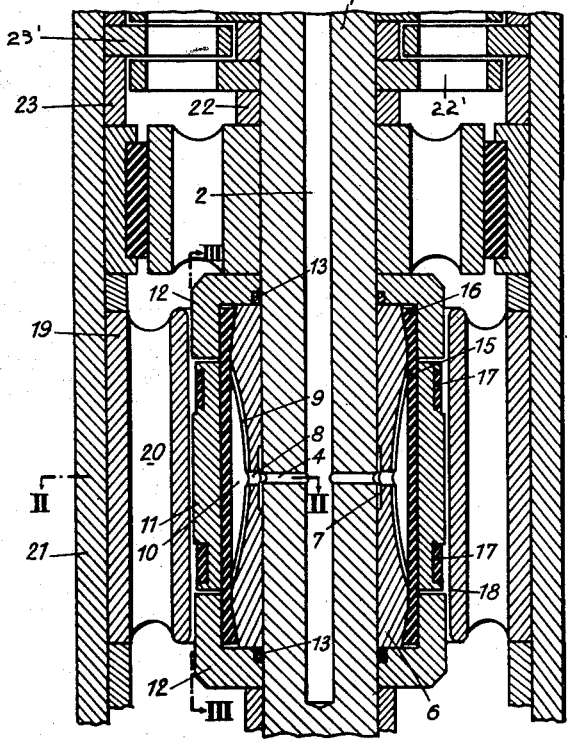

United States Patent Office 2,952,440
Patented Sept. 13, 1960.

2,952,440

WELL-DRILLING TURBINES

Wladimir Tiraspolsky, 69 Ave. Victor Cresson, Issy-les-Moulineaux; Roger François Rouviere, Castor, Lot No. 24, Aureilhan; and Jean Charé, Chemin d'Urac, Tarbes, France Filed Apr. 10, 1958, Ser. No. 727,621

Claims priority, application France Apr. 15, 1957

8 Claims. (Cl. 253—3)

The present invention relates generally to well-drilling turbines such as those used for the exploitation of oil fields.

Several technical solutions have already been proposed in an endeavor to provide a turbine whose operation should be automatically stopped as soon as a permissible limit of axial wear of the turbine elements or axial clearance (due for example to upsetting or distortion of parts of the stacked structures of stator or rotor parts or alternatively to undue unscrewing action) is reached so as to stave off any damage that might result from overreaching said limit.

Technical solutions of the aforesaid problem are based either on a more or less complete sealing of the channels through which the power fluid for the turbine flows or on a triggering of braking devices actuated by the thrust exerted in the one or the other direction upon the turbine rotor or by suitable elastic means.

It is an object of the invention to provide a well-drilling turbine having such a construction that it is automatically braked as soon as a permissible limit of wear is reached, the braking action being triggered by the power fluid itself.

Another object of the invention is to provide an improved well-drilling turbine comprising on the one hand a braking system whose movable elements are connected for joint angular motion to one of the stacked structures (either the rotor structure or the stator structure) of the turbine and are adapted to come into contact with associated frictional surfaces provided in the other stacked structure and on the other hand means for subjecting said movable elements of the braking system to the action of such a pressure of the power fluid as will trigger the braking phenomenon when a limit of axial wear or permissible axial clearances are reached or about to be reached.

Viewed in a particular aspect, the improved turbine comprises a braking system whose movable elements constituted for example by shoe members are shifted for procuring the braking action by an elastic membrane the two faces of which are subjected to a pressure differential capable of ensuring said action as the aforesaid limit of axial wear is substantially reached, said movable elements being preferably shifted radially and being guided by suitable bracing struts.

The elastic membrane may be made of rubber or an equivalent elastomer and is mounted at a preset position of a stack of turbine parts. For ensuring the braking action, one face of the membrane may be put into communication with a region of the turbine where a higher pressure prevails, thereby causing actuation of the movable elements of the braking system. Such a communication may be ensured for example by a normally closed channel or conduit which is automatically opened when the aforesaid permissible limit is reached or approximately reached.

Advantageously the movable elements i.e. the shoe members of the braking system are held in a retracted position off the companion braking surfaces by elastic or resilient means capable of yielding for permitting a braking action when the aforesaid fluid pressure exerts itself upon the membrane.

When the braking system is fitted upon the turbine shaft, the communication which is used for triggering the braking action as indicated hereinbefore may be advantageously performed through an axial channel formed in the shaft and closed after having been filled with liquid, the end of said channel that is remote from the membrane which is situated at a position where said higher pressure prevails being opened as the limit of wear is reached. Such opening which provides communication with the surrounding fluid may be performed by a valve or by a piercing or braking action. There may be provided for example at said position a thin walled closing element adapted to cause a braking action when the limit of wear is substantially reached. Higher pressure then establishes itself in the communication channel and operates differentially on the membrane for shifting the shoe members of the braking system.

This contrivance permits a braking force to be obtained which at any time is substantially proportional to the efforts to be braked because in order to stop the operation of the turbine an inertia force $F$ which is proportional to the square value of the rotational speed $F = Kn^2$ must be overcome.

However $n^2$ is substantially proportional to the square value of the fluid flow $Q^2$ and this is also true of the power torque which still operates on the turbine rotor. The difference between the pressure $P_1$ and $P_2$ between two positions is also proportional to $Q^2$ if the blade system of the turbine is situated intermediate said positions. Therefore it seems advantageous for the braking system to be arranged under the blade system of the turbine and for the communication channel to have its mouth at a position situated at the head extremity of the turbine.

A further object of the invention is to provide a well-drilling turbine wherein the braking method is not influenced by clearances existing between the rotor and the stator of the turbine due for instance to eccentricity of the shaft or progressive wear of the elements of the braking system.

A still further object of the invention is to provide a turbine as aforesaid whose braking shoe members and the bracing struts which guide them are provided with ramps adapted to cooperate for providing, after the braking action, a connection for joint angular motion between the rotor and the stator, thereby permitting the drilling tool to be revolved from the ground surface through the medium of the drilling rods or stems which gives the possibility, if this is desirable, to continue the well-drilling operation by the so-called "rotary method" before lifting the string of stems for putting the turbine into service again. Such means procuring joint angular motion may be intentionally triggered from the ground surface.

With these and such other objects in view as will incidentally appear hereafter, the invention comprises the novel construction and combination of parts that will be now described with reference to the accompanying diagrammatic drawings illustrating the same and forming a part of the present disclosure.

In the drawings:

Figure 1 is a fragmentary sectional elevational view of a well-drilling turbine equipped with a braking system according to the invention.

Figure 2 is a partial transverse sectional view on the line II—II in Fig. 1.

Figure 3 is a fragmentary sectional elevational view looking in the direction indicated by the line III—III in Fig. 1.

Figure 4:
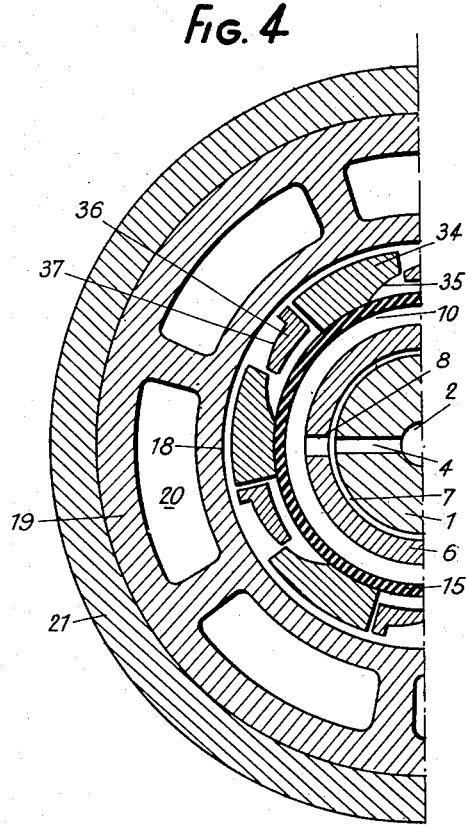
Figure 4 is a transverse sectional view corresponding to Fig. 2 but relating to a further modification.

As shown in the drawings, 1 designates the turbine shaft which has an axial channel 2 closed at its upper end by a threaded plug 3. The shaft 1 is provided with several radial passages 4 for the pressure intake to the braking system and with a set of radial ducts 5 through which pressure is established.

The actual braking system comprises a core 6 in which a pressure-distributing chamber 7 is formed, said chamber communicating with the passages 4 and with channels 8 which end in distributing grooves 9 formed in the bottom of a compensating chamber 10.

The movable elements of the braking system are constituted by shoe members 11 the outer face of which may have received, if this is deemed useful, a special treatment or lining adapted to enhance their frictional coefficient and their resistance to wear. The shoe members 11 are guided between caps 12 which prevent them from being axially displaced and which are provided with grooves surrounding the shaft 1 for receiving gaskets 13. The shoe members are guided radially by fingers 14 (see Figs. 2 and 3) which extend from the caps 12 and are directed toward each other.

A braking membrane 15 made of an elastic material such as rubber is provided sleeve-wise around the core 6 of the braking system and separates said core 6 from the shoe members 11. The ends 16 of the membrane 15 form heel parts that cement the same to the core 6.

The shoe members 11 are normally maintained applied against the membrane 15 for example by elastic ring members 17 made of rubber or the like which are housed in suitable recesses in said shoe members.

The outer faces of the shoe members 11 are arranged opposite a braking surface 18 which may have undergone a special treatment or may be furnished with a friction lining. Such surface is carried by a braking body 19 having circulation channels or grooves 20 and fixed to the turbine body 21.

The braking system is provided under the set of blades of the turbine. In the showing of Fig. 1 a stack of rotor parts 22, including rotor blades 22' and shoe members 11, are connected for joint angular motion with shaft 1 and a stack of stator parts 23, including stator blades 23' and the brake body 19, are affixed to turbine body 21. Gaskets 24 housed in suitable grooves in the upper element of the stack of rotor parts surround the turbine shaft 1. Said element defines with another element 25 rigidly connected to the shaft 1 by a feather 26 a recess in which is received a screw 27 bored at 28 whose head provides a thin wall 29.

Shear discs 30 are provided adjacent the upper part of the stack of stator parts 23 of the turbine. Said discs 30 have circulation channels 31 and carry near their inner periphery shear ring members 32 engageable with the thin wall 29 of the hollow screw 27 as indicated hereafter.

The operation of the braking system associated with the turbine is as follows:

During the operation of the turbine, the pressure $P_1$ which prevails in the head portion of the turbine above the set of blades is higher than the pressure $P_2$ which prevails near the body 19 of the braking system owing to the drop of pressure which occurs in the set of blades.

When the axial wear reaches the limit value in the one or the other direction, the shear ring members 32 engage the thin wall 29 of the hollow screw 27 and break it off.

Fluid pressure $P_1$ which prevails near the hollow screw 27 is then transmitted through the channels 5, 2, 4 and 8 to the compensating chamber 10 whereby on the opposite sides of the elastic membrane 15 a difference of pressures is obtained which deflects it outwardly. The membrane thus repels the shoe members 11 against the braking surface 18 of the body 19 of the braking system. This gradually slows down the operational speed of the turbine.

In the constructional modification, shown in Fig. 4, the braking shoe members 34 are provided with ramps 35 on their face opposite to the braking surface while the guiding struts 36 have ramps 37. Assuming the turbine to occupy its normal position of operation, the shoe members 34 and the struts 36 abut one another and cooperate as shown so that any undue jamming is prevented. As a limit of axial wear is reached, the shoe members 34 are radially pushed off outwards by the elastic membrane 15 as before. By then rotating the turbine body while pressing upon the tool, it is possible to bring the ramps 35 into engagement with the shoe members 34 on the ramps 37 of the struts 36, thereby achieving a strong wedging action between the rotor and stator. This permits the drilling operation to be pursued by the so-called "rotary method" in spite of the turbine being out of service.

Other constructional modifications are conceivable without departing from the ambit of the invention and the scope of the subjoined claims.

What is claimed is:

1. In a well-drilling turbine including a stack of stator parts, a stack of rotor parts, and a shaft on which said stack of rotor parts is mounted, said turbine being actuated by a power fluid flowing through said stacks; a braking system adapted to stop the operation of the turbine when a limit value of permissible axial wear is reached and comprising radially movable braking shoe members angularly rigid with said rotor parts, friction surfaces angularly rigid with said stator parts, an elastic membrane having an outer face and an inner face and carrying said shoe members, an axial bore provided in said shaft in communication with said inner face of the membrane, ducts connecting said axial bore with the outside of said shaft, obturating members closing said ducts, said obturating members being mounted upstream of said membrane with respect to the direction of flow of the power fluid through the turbine, and axial wear responsive means opening said obturating members when said limit of permissible axial wear is reached so that a higher fluid pressure is then admitted to the inner face of said membrane for applying said braking shoes against said friction surfaces.

2. A turbine according to claim 1, wherein said membrane is mounted downstream of said stacks, while said obturating members are located upstream thereof with respect to the direction of flow of the power fluid.

3. In a well-drilling turbine including a stack of stator parts, a stack of rotor parts, and a shaft on which said stack of rotor parts is mounted, said turbine being actuated by a power fluid flowing through said stacks; a braking system adapted to stop the operation of the turbine when a limit value of permissible axial wear is reached and comprising an annular carrier concentric with the turbine shaft, an elastic membrane on said annular carrier, braking shoe members so mounted on said carrier as to be radially displaceable, holding means for maintaining said shoe members against said elastic membrane, annular friction surfaces arranged concentrically about said shoe members and rigid with the stack of stator parts, said membrane having an outer face and an inner face, an axial bore provided in said shaft in communication with said inner face of the membrane, ducts connecting said axial bore with the outside of said shaft, obturating members closing said ducts, said obturating members being mounted upstream of said membrane with respect to the direction of flow of the power fluid through the turbine, and axial wear responsive means opening said obturating members when said limit of permissible axial wear is reached, so that a fluid pressure higher than that acting upon the outer face of said membrane is admitted to its inner face for applying said braking shoes against said friction surfaces.

4. A turbine according to claim 3, wherein said membrane is mounted downstream of said stacks, while said obturating members are located upstream thereof with respect to the direction of flow of the power fluid.

5. In a well-drilling turbine including a stack of stator parts, a stack of rotor parts, and a shaft on which said stack of rotor parts is mounted, said turbine being actuated by a power fluid flowing through said stacks; a braking system adapted to stop the operation of the turbine when a limit value of permissible axial wear is reached and comprising radially displaceable braking shoe members angularly rigid with said rotor parts, friction surfaces rigid with said stator parts, an elastic membrane having an outer face and an inner face and carrying said shoe members, an axial bore provided in said shaft in communication with said inner face of the membrane, said membrane being mounted downstream of said stacks with respect to the direction of flow of the power fluid, radial ducts connecting said axial bore with the outside of said shaft and provided upstream of said stacks with respect to the direction of flow of the power fluid, thin walled obturating members for normally closing said radial ducts, and shear means arranged axially in front of said thin walled members at a distance therefrom smaller than said limit value of permissible axial wear so as to cut off the walls of said members when said limit value is reached to apply to the inner face of said membrane a pressure higher than that acting upon its outer face and to cause said shoe members to come into contact with said friction surfaces.

6. A turbine according to claim 5, wherein said obturating members comprise thin walled screws threaded into said radial ducts of the shaft, said shear means comprising shear ring members located on either side of said screws and axially spaced from the thin walls of said screws of a distance smaller than said limit value of permissible axial wear of the turbine.

7. In a well-drilling turbine including a stack of stator parts, a stack of rotor parts, and a shaft on which said stack of rotor parts is mounted, said turbine being actuated by a power fluid flowing through said stacks; a braking system adapted to stop the operation of the turbine when a limit of permissible axial wear is reached and comprising an annular core mounted upon the turbine shaft, a cylindrical elastic membrane surrounding said core and having an outer face and an inner face, braking shoe members arranged about said membrane, resilient ring members holding said shoe members on said membrane, end caps adapted upon said core, said caps including fingers for guiding the braking members, friction surfaces rigid with said stack of stator parts and encompassing said braking shoe members, said membrane being located downstream of said stacks with respect to the direction of flow of the power fluid, an axial bore provided in said shaft in communication with the inner face of the membrane, radial ducts connecting said axial bore with the outside of the shaft located upstream of said stacks with respect to the direction of flow of the power fluid, obturating members closing said ducts, and axial wear responsive shear means opening said obturating members when the limit of admissible axial wear is reached so that a pressure higher than that acting upon the outer face of said membrane is admitted to its inner face for applying said shoe members against said friction surfaces.

8. A turbine according to claim 7, comprising ramps provided on said braking shoe members, and complementary ramps provided on the guiding fingers, said ramps cooperating after the braking action for imparting rotation to the tool responsive to the exertion of a torque upon the stack of stator parts of the turbine.

References Cited in the file of this patent
UNITED STATES PATENTS

| | | |
|---|---|---|
| 2,251,445 | Fawick | Aug. 5, 1941 |
| 2,603,997 | Boice | July 22, 1952 |
| 2,641,441 | Nilsen et al. | June 9, 1953 |
| 2,662,625 | Fawick | Dec. 15, 1953 |